United States Patent
Meyers

[11] 3,886,346
[45] May 27, 1975

[54] REHEATING AND RECONSTITUTION APPARATUS

[75] Inventor: Peter G. Meyers, Manchester, Conn.

[73] Assignee: Meyers Systems and Technology, Inc., Manchester, Conn.

[22] Filed: Oct. 19, 1973

[21] Appl. No.: 407,926

[52] U.S. Cl. .......... 219/386; 62/3; 165/48; 165/63; 165/64; 219/411; 219/432; 219/530; 219/401; 312/214

[51] Int. Cl. .................................. F27d 11/00

[58] Field of Search ........... 219/385, 386, 387, 401, 219/411, 432, 521, 530; 62/3; 165/48, 63, 64; 312/214

[56] References Cited
UNITED STATES PATENTS

| | | | |
|---|---|---|---|
| 2,991,627 | 7/1961 | Suits | 62/3 |
| 3,199,579 | 8/1965 | Foster et al. | 165/48 |
| 3,340,380 | 9/1967 | Molitor | 219/386 |
| 3,408,481 | 10/1968 | Golden | 219/386 |
| 3,414,709 | 12/1968 | Tricault | 219/411 |
| 3,478,193 | 11/1969 | Molitor | 219/386 |
| 3,573,430 | 4/1971 | Eisler | 219/385 |
| 3,601,582 | 8/1969 | DeBoisfleury | 219/388 |
| 3,648,462 | 3/1972 | Chapman | 62/3 |
| 3,725,645 | 4/1973 | Shevlin | 219/387 X |
| 3,732,702 | 5/1973 | Desch | 62/3 |
| 3,808,825 | 5/1974 | Ciurea | 62/3 |

*Primary Examiner*—Volodymyr Y. Mayewsky

[57] ABSTRACT

A food reheating and reconstitution apparatus and method is presented employing thermoelectric devices, infrared heaters, and moisturizing for a vertically stacked array of food trays. The hot junctions of the thermoelectric device heat the bottom of a food tray; the cold junctions of that thermoelectric device provide a cooling effect for the surface of the food at the next lower tray to prevent scorching from the infrared heaters which heat the upper surface of the food in that lower tray; and the hot junctions of the thermoelectric device heat a water supply to provide moisturizing vapor for the food.

12 Claims, 2 Drawing Figures

PATENTED MAY 27 1975　　　　　　　　　　　　　　　　3,886,346

REHEATING AND RECONSTITUTION APPARATUS

BACKGROUND OF THE INVENTION

This invention relates to the field of food reheating and reconstitution apparatus and methods. More particularly, this invention relates to food reheating and reconstitution apparatus and methods employing a cooperative arrangement of thermoelectric heating and cooling, infrared heating, and moisturizing which provides fast reheating and reconstitution of food in a simplified and controlled manner for preventing scorching of food surfaces and maintaining desired moisturization of food.

The problem of effective reheating and reconstitution of food without impairment of the quality of the food is present in many facets of life. The problem is particularly present in institutional environments such as hospitals, convalescent homes and nursing homes. The problem is also present in some of the so-called "meals on wheels" programs which were recently instituted in many communities whereby meals are delivered to the homes of elderly people. The food, which has been previously prepared, may either be of the type which is frozen and then removed from frozen storage to be heated and served, or it may be intended to be transported from central kitchen facility immediately to various serving locations such as the rooms of a large hospital. In any event, the food must be reheated and/or reconstituted prior to serving so that it is at the proper temperature and in the proper condition for consumption.

Prior art techniques for heating and/or reconstituting food for these purposes have encountered a number of problems. Establishing and maintaining proper temperature for the food has been difficult to accomplish; the food is often unevenly heated, with either the top or the bottom of the food, depending on where the heat is applied, being too hot and other parts being too cold; the upper surface of the food has often had a tendency to scorch if infrared or other direct heating is employed; and the food is often demoisturized in the heating and/or reconstitution process.

Prior art techniques for heating and/or reconstituting food have included suggestions for the use of either thermoelectric devices or radiant reheating devices, and moisturizing has been suggested. Known typical examples in the prior patent art are found in the U.S. Pats. to Frantti, et al. No. 2,959,925, Molitor No. 3,038,986, Golden No. 3,408,481 and Lavenback No. 3,545,832. However, neither these patents nor any other known prior art apparatus or techniques adequately solve the problems of scorching at the surface of food and demoisturization (problems which are particularly serious in reheating techniques) and the problem of even heat distribution.

SUMMARY OF THE INVENTION

The above discussed and other problems of the prior art are met and significantly reduced or overcome by the apparatus and method of the present invention. The present invention is particularly suitable for use in an environment, such as a food transportation and service cart where the food is stacked in a vertically spaced array, such as at vertically spaced apart stations. A cooperative arrangement of thermoelectric heating and cooling, infrared heating, and moisturization with heated water vapor is employed to provide an extremely effective and efficient food reheating and reconstitution apparatus and method.

The hot junctions of a thermoelectric device are located under the lower surface of each serving tray or food pan of a vertical array to serve as a heat source for heating the underside of the food container at the station above the hot junctions. A steam chamber is interposed between the hot junctions of the thermoelectric device and the food to be heated so that the heat from the hot junctions of the thermoelectric device is used to heat and vaporize the water within the steam chamber. The cold junctions of the thermoelectric device and one or more infrared heating elements are positioned opposite to and above the top surface of the food container at the next lower station. That food container at the next lower station is, of course, heated from beneath in the same manner as previously mentioned in discussing the hot junctions of the thermoelectric device. The infrared heating elements serve as a heat source to deliver heat to warm the upper surface of the food so that the food is heated from both the top and bottom, and the cold junctions of the thermoelectric device serve as a heat sink to cool the air in the space between the infrared heater and the food to prevent scorching of the surface of the food. A bleed line from the steam chamber delivers water vapor to the surface of the food to provide a controlled moisturization.

As will be seen from the foregoing summary, the apparatus and method of the present invention results in a food heating and reconstitution system wherein the food is heated from both the top and the bottom to provide even heating distribution, and wherein scorching of the top surface of the food is eliminated, and wherein controlled steam moisturization is achieved. Heating from the bottom is controlled or limited in the sense that the hot junctions of the thermoelectric device are used to heat the water in a steam chamber rather than being applied directly to the lower surface of the food. This effectively limits the highest temperature to which the lower surface of the food is exposed to the boiling point of water. Similarly, the cold junctions of the thermoelectric device above the upper surface of the food tend to draw heat from the upper surface of the food, thus providing an effective limit on the heating done by the infrared heaters and thereby preventing scorching of the food, which has been a serious problem with previous infrared heating devices.

BRIEF DESCRIPTION OF THE DRAWINGS

Referring now to the drawings, wherein like elements are numbered alike in the two figures.

DESCRIPTION OF THE PREFERRED EMBODIMENT

Figure 1:
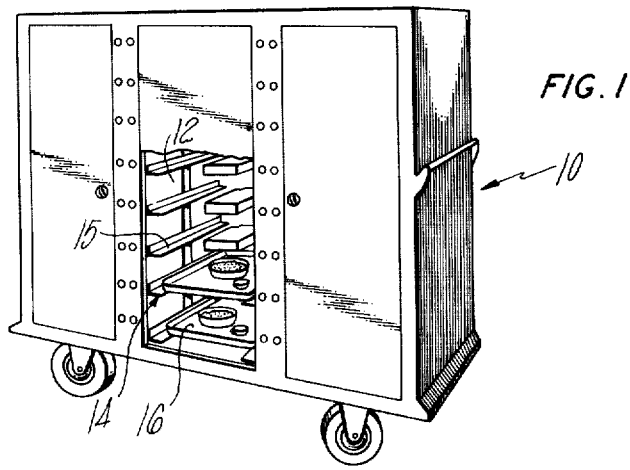
FIG. 1 is a perspective view of a food service cart showing the general environment of the present invention.

Referring now to FIG. 1, the present invention is shown in the general environment of a food cart 10 which may be used to transport food from a central area, such as a preparatory kitchen or frozen storage area, to the place at which it is to be served, such as the individual rooms of a hospital. The cart may have one or more storage chambers 12 to which access is obtained by doors or other standard arrangements. One of the storage chambers 12 is shown with the door of the storage chambers 12 is shown with the door partly broken away in FIG. 1 to show a vertical array of spaced apart stations 14, consisting of shelf brackets 15, at which food trays 16 are positioned for transportation.

Figure 2:
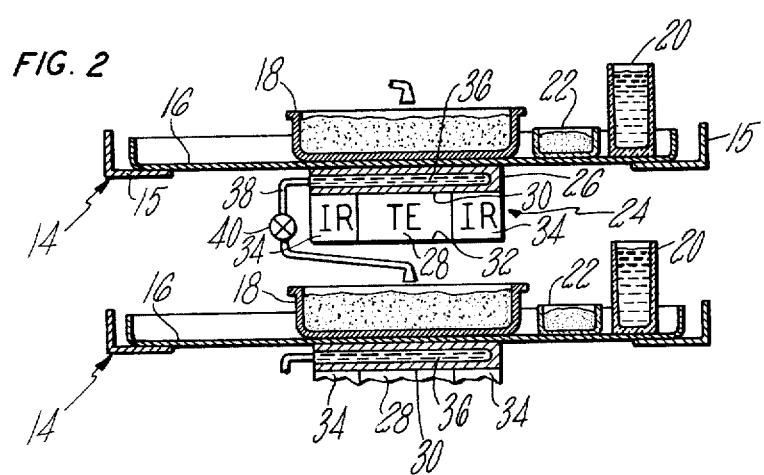
FIG. 2 is a front elevation view showing a pair of spaced apart shelves of the food cart of FIG. 1.

Referring now to FIG. 2, two vertically adjacent stations 14 are shown. It will be understood that the showing in FIG. 2 is representative of the configuration which is repeated for each pair of adjacent stations in the array, and it will be sufficient for an understanding of the invention to describe the structure with respect to the two adjacent stations shown in FIG. 2.

Still referring to FIG. 2, each of the trays 16 is shown containing a hot food dish 18, i.e., a dish containing food which is to be served hot. Other food to be served at room temperature and/or utensils may be located at other positions on tray 16, such as at 20 and 22.

The desired heating, cooling and moisturizing of food in dish 18 is accomplished by a condition control module 24 located between each pair of adjacent stations 14. The condition control module includes a steam generating chamber 26 in abutting contact with the underside of the tray 16, a thermoelectric unit 28 with the hot side 30 adjacent to and contacting the steam generating unit and the cold side 32 removed from the steam generating unit, and one or more infrared heaters 34 along side the thermoelectric device. Thermoelectric device 28 and the infrared heaters 34 are powered by suitable electric sources and may, if desired, be thermostatically or time controlled. The condition control modules 24 are mechanically supported in any convenient way, such as by being connected to the back of the food cart where electrical power supplies may also be located.

There is a condition control module located between each pair of adjacent stations immediately below each station, and each condition control module affects both the dish 18 from the station below it and the dish 18 on the station above it. The hot junctions 30 of the thermoelectric unit heat steam generating chamber 26 so a portion of the water 36 therein is heated and converted to steam. The heat is then transferred to the underside of the dish 18 on the tray above. Thus, the hot junctions 30 deliver heat to the underside of the food in a dish 18 to heat the food, and overheating from the bottom is avoided by limiting the bottom heating temperature to the boiling point of water since the heat is transferred via steam generating unit 26. At the same time the heat is being delivered to the bottom of a dish 18, heat is also being delivered to the top surface of the food in dish 18 via infrared heaters 34 from the next above station. The heat from IR units 34 is applied directly to the upper surface of the food, and, as with any directly heating, the possibility of scorching the food exists. Scorching is prevented in the present invention by the location of the cold junctions 32 above the dish 18. The cold junctions 32 cool the intermediate air layer between the food in dish 18 and the condition control module, thus regulating the temperature at the upper surface of the food and preventing scorching of the upper surface.

As will be seen from the foregoing discussion, the food in a dish 18 is heated in a controlled manner both from above and below. The heating from below is from the hot junctions 30 of the thermoelectric device, with control being achieved through the steam generating chamber 26; the heating from above is from the infrared heaters 34, with control being achieved through the use of cold junctions 32 of the thermoelectric device. Thus, condition control module 24 forms a novel and particularly efficient heating and control unit.

The steam generating chamber 26 also serves a further purpose of supplying vapor to maintain a desired moisturization of the food in each dish 18. A bleed line 38 extends from each steam generating unit to the location of the food dish to the tray below. Steam is bled off from chamber 26 via bleed line 38 to deliver water vapor to the top of food in dish 18 to moisturize the food. Appropriate valving, such as valve 40 may be incorporated to provide either a constant moisturizing or controlled intermittent moisturizing or to prevent moisture flow under certain circumstances where it is not desired.

The thermoelectric units 28 are available in the form of flat slabs. Similarly, although other kinds of radiant heat elements are available, it is preferred that the infrared heating units 34 be low intensity ceramic type IR heating units which may also be in the form of flat slabs. The infrared units and the thermoelectric unit may thus be formed into a single flat package with no moving parts and no open spaces. This configuration is particularly desirable for food heating applications since it eliminates open areas where dirt, bacteria, or other undesirable matter may accumulate. The heating unit of the present invention permits heating of individual trays in a serving cart as may be desired. Furthermore, it will be apparent that a plurality of the condition control modules 24 can be distributed along the underside of each station if it is desired to have a unit with large stations which store a plurality of food containers. The present invention results in relatively uniform heating over both the top and bottom of food to be reheated or reconstituted, and the cooling action of the cold junctions 32 tend to overcome differences in radiation absorption among different foods. Heating and reconstitution can be accomplished relatively quickly, within the range of 5 to 10 minutes, and power requirements are low, both because of the type of elements employed and because of the dual function of the thermoelectric unit 28.

While this invention is particularly suitable for the food environment which has been discussed, it is also well suited for any applications requiring heating and reconstitution of stored material. By way of one example only, the invention may be employed in industrial environments where material, such as plastics, is to be heated for processing after cold storage to inhibit curing.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for heating a material to be heated, including:
   first thermoelectric means positioned on a first side of material at a first station to be heated, said first thermoelectric means having opposed hot and cold junctions, the hot junctions of said first thermoelectric means being positioned to serve as a heat source for said first side of the material to be heated;

second thermoelectric means positioned on a second side of the material to be heated, said second thermoelectric means having opposed hot and cold junctions, the cold junctions of said second thermoelectric means being positioned to serve as a heat sink for said second side of the material to be heated; and infrared heating means positioned adjacent said second thermoelectric means to serve as a heat source for said second side of the material to be heated.

2. Heating apparatus as in claim 1 wherein:
said first and second thermoelectric means are in a spaced apart array; and including
infrared heating means positioned adjacent said first thermoelectric means to serve as a heat source for material at a second station to be heated, said cold junctions of said first thermoelectric device being positioned to serve as a heat sink for material at the second station to be heated.

3. Heating apparatus as in claim 2 wherein:
said hot junctions of said second thermoelectric means is positioned to serve as a heat source for material at a third station to be heated.

4. Apparatus for heating a material to be heated, including:
first condition control means positioned on a first side of a first station at which material is to be heated and on a second side of a second station; and
second condition control means positioned on a second side of the first station at which material is to be heated and on a first side of a third station, the first, second and third stations being in a spaced apart array;
each of said condition control means having thermoelectric means with opposed hot and cold junctions, infrared heating means adjacent the thermoelectric means, and heat transfer means adjacent the hot junctions;
said heat transfer means of said first condition control means being positioned adjacent the first station and serving to transfer heat from the hot junctions of the first condition control means to a part of the material to be heated at the first station;
said infrared heating means of said second condition control means serving as a heat source for another part of the material at the first station;
said cold junctions of said second condition control means being positioned to serve as a heat sink with respect to the material at the first station.

5. Heating apparatus as in claim 4 wherein:
said heat transfer means includes steam chamber means.

6. Heating apparatus as in claim 5 including:
means for delivering water vapor from said steam chamber means to the material at the first station for conditioning thereof.

7. Heating apparatus as in claim 4 wherein:
material is to be heated at said second and third stations;
said cold junctions of said first condition control means is positioned to serve as a heat sink for the material at said second seation;
said infrared heating means of said first condition control means is positioned to serve as a heat source for a part of the material at the second station; and
said heat transfer means of said second condition control means is positioned adjacent the second station and serves to transfer heat from the hot junctions of the second condition control means to part of the material to be heated at the first station.

8. Heating apparatus as in claim 4 wherein:
said condition control means is a module with hot and cold junctions of the thermoelectric means in a linear array and the infrared heating means along side said linear array.

9. Apparatus for heating food including:
at least one station at which food is to be heated;
first condition control means below said station;
second condition control means above said station;
each of said condition control means having thermoelectric means with opposed hot and cold junctions, infrared heating means adjacent the thermoelectric means, and heat transfer means adjacent the hot junction;
said heat transfer means of said first condition control means serving to transfer heat from the hot junctions of the thermoelectric means thereof to the lower part of the food to be heated at the station;
said infrared heating means of said second condition control means serving to deliver heat the upper part of the food to be heated at the station; and
said cold junctions of the thermoelectric means of the second condition control means serving as a heat sink with respect to the upper part of the food to be heated at the station.

10. Heating apparatus as in claim 9 including:
means for moisturizing the food to be heated.

11. Heating apparatus as in claim 9 wherein:
said heat transfer means includes steam chamber means; and including
means for delivering water vapor from the steam chamber of one of said condition control means to the upper part of the food at the station.

12. Heating apparatus as in claim 9 including:
a plurality of stations in a vertically spaced apart array at which food is to be heated; and further including
first and second of said condition control means below and above each station, respectively.

* * * * *